United States Patent Office 3,317,586
Patented May 2, 1967

1

3,317,586
DIALKOXYCYCLOBUTANE CARBOXYLIC ACID ESTERS AND THEIR PREPARATION
Robert D. Burpitt, and Kent C. Brannock, Kingsport, Tenn., assignors to Eastman Kodak Company, Rochester, N.Y., a corporation of New Jersey
No Drawing. Filed Aug. 17, 1964, Ser. No. 390,214
6 Claims. (Cl. 260—468)

This invention relates to novel compounds and more particularly to novel dialkoxycyclobutane carboxylic acid esters and to a method of preparing them.

We have discovered that when a ketene acetal of the type, $H_2C=C(OR^1)_2$, is caused to react with an olefinic ester of the type, $R^2—CH=CH—COOR^3$, novel cyclobutane compounds are formed. The method of the invention and the new compounds are represented by the following equation:

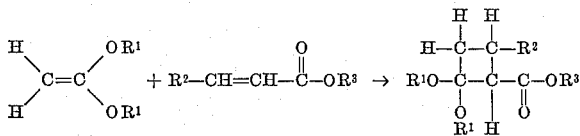

wherein $R^1$ is straight or branched chain lower alkyl, $R^2$ is hydrogen, cyano or

and $R^3$ is straight or branched chain lower alkyl. The reaction is accomplished by heating the reactants, e.g., at reflux temperature, in approximately equimolar proportions, although an excess of either can be used, preferably in a inert solvent, e.g., a dipolar aprotic solvent such as acetonitrile, dimethylformamide, dimethylsulfoxide, nitrobenzene or the like.

The new compounds are useful as chemical intermediates. For example, by acid catalyzed hydrolysis the cyclobutane ring is cleaved and the carbalkoxy and alkoxy groups are converted to carboxy groups, thus yielding valuable aliphatic di- and tricarboxylic acids which are useful for many purposes, e.g., in the production of polyesters and polyamides.

The following examples illustrate the method and compounds of the invention and the utility of the new compounds.

Example 1

Ketene diethyl acetal (20.0 g., 0.172 mole), methyl acrylate (15.0 g., 0.174 mole) and 50 ml. of acetonitrile were combined and heated under reflux at 80–81° C. for 190 hours. Distillation of the reaction mixture gave, after removal of solvent and unreacted starting materials, 22 g. (63%) of methyl, 2,2-diethoxycyclobutane-1-carboxylate. B.P. 52–55° C. at ca. 0.8–1 mm., $n_D^{20}$ 1.4324. Treatment of the latter compound (10.0 g., 0.4595 mole) with 15 ml. of water, 10 ml. of methanol, and 0.05 ml. of conc. hydrochloric acid for 3.5 hours on the steam bath followed by cooling and filtration gave 4.8 g. (72%) of glutaric acid.

Example 2

A mixture of ketene diethyl acetal (30.0 g., 0.259 mole), diethyl fumarate (41.0 g., 0.24 mole), and 75.0 ml. of acetonitrile were combined and refluxed 190 hours. Distillation of the reaction mixture gave, after removal of the solvent and unreacted starting materials, 12 g. (17.4%) of diethyl 3,3-diethoxycyclobutane 1,2-dicarboxylate, B.P. 140–150° C. at 0.3–0.3 mm., $n_D^{20}$1.4730.

In a series of reactions similar to those described in Example 1, the latter compound was converted to propane-1,2,3-tricarboxylic acid in good yield.

In a similar manner ketene dimethyl acetal and ethyl acrylate yield ethyl 2,2-dimethoxycyclobutane-1-carboxylate; ketene diisopropyl acetal and methyl 3-cyanoacrylate yield methyl 2-cyano-3,3-diethoxycyclobutane-1-carboxylate; and ketene dibutyl acetal and diisobutyl fumarate yield diisobutyl 3,3-dibutoxycyclobutane-1,2-dicarboxylate.

Although the invention has been described in considerable detail with particular reference to certain preferred embodiments thereof, it will be understood that variations and modifications can be effected within the spirit and scope of the invention as described hereinabove, and as defined in the appended claims.

We claim:
1. The method of preparing alkoxycyclobutanecarboxylates of the formula

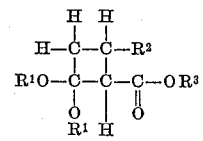

which comprises heating of a ketene acetal of the formula, $H_2C=C(OR^1)_2$, with an olefinic ester of the formula, $R^2CH=CH—COOR^3$, wherein $R^1$ and $R^3$ are lower alkyl and $R^2$ is selected from the group consisting of hydrogen, cyano and $—COOR^3$.

2. The method of preparing methyl 2,2-diethoxycyclobutane-1-carboxylate which comprises heating a mixture of ketene diethyl acetal and methyl acrylate.

3. The method of preparing diethyl 3,3-diethoxycyclobutane-1,2-dicarboxylate which comprises heating a mixture of ketene diethyl acetal and diethyl fumarate.

4. A compound of the formula

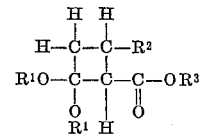

wherein $R^1$ and $R^3$ are lower alkyl and $R^2$ is selected from the group consisting of hydrogen, cyano and $—COOR^3$.

5. Methyl 2,2-diethoxycyclobutane-1-carboxylate.
6. Diethyl 3,3-diethoxycyclobutane-1,2-dicarboxylate.

References Cited by the Examiner

Brannock et al., "J. Org. Chem.," vol. 29 (1964), pp. 940–941, QD241.J6.

LORRAINE A. WEINBERGER, *Primary Examiner.*

RICHARD K. JACKSON, *Assistant Examiner.*